(12) United States Patent
Grieve

(10) Patent No.: US 9,410,534 B2
(45) Date of Patent: Aug. 9, 2016

(54) WIND POWERED ELECTRICAL GENERATOR HAVING A VARIABLE SPEED CLUTCH ARRANGEMENT

(71) Applicant: Dennis Grieve, Star, ID (US)

(72) Inventor: Dennis Grieve, Star, ID (US)

(*) Notice: Subject to any disclaimer, the term of this patent is extended or adjusted under 35 U.S.C. 154(b) by 27 days.

(21) Appl. No.: 14/207,877

(22) Filed: Mar. 13, 2014

(65) Prior Publication Data

US 2014/0265345 A1  Sep. 18, 2014

Related U.S. Application Data

(60) Provisional application No. 61/779,364, filed on Mar. 13, 2013.

(51) Int. Cl.
*F03D 9/00* (2016.01)
*F03D 11/02* (2006.01)

(52) U.S. Cl.
CPC ......... *F03D 11/02* (2013.01); *F05B 2260/4021* (2013.01); *F05B 2260/4023* (2013.01); *Y02E 10/722* (2013.01)

(58) Field of Classification Search
CPC ... F03D 5/02; F03D 11/02; F05B 2260/4021; F05B 2260/4023
USPC ....... 290/44, 55; 415/4.2, 4.1, 2.1; 416/132 B
See application file for complete search history.

(56) References Cited

U.S. PATENT DOCUMENTS

| | | | | | |
|---|---|---|---|---|---|
| 2,058,500 | A * | 10/1936 | Plucker | | 290/55 |
| 2,403,564 | A * | 7/1946 | Stein | | 290/44 |
| 4,186,314 | A * | 1/1980 | Diggs | | 290/55 |
| 4,204,126 | A * | 5/1980 | Diggs | | 290/55 |
| 4,229,661 | A * | 10/1980 | Mead et al. | | 290/44 |
| 4,585,950 | A * | 4/1986 | Lund | | 290/44 |
| 4,613,763 | A * | 9/1986 | Swansen | | 290/44 |
| 4,757,211 | A * | 7/1988 | Kristensen | | 290/55 |
| 5,137,417 | A * | 8/1992 | Lund | | 415/4.1 |
| 5,140,856 | A * | 8/1992 | Larsen | | 73/455 |
| 6,856,042 | B1 * | 2/2005 | Kubota | | 290/55 |
| 7,323,792 | B2 * | 1/2008 | Sohn | | 290/55 |
| 8,851,839 | B2 * | 10/2014 | Eckart | | 416/9 |
| 8,912,681 | B1 * | 12/2014 | Filkins | | 290/55 |
| 2008/0272596 | A1 * | 11/2008 | House | | 290/44 |
| 2012/0068466 | A1 * | 3/2012 | Gilbert | | 290/55 |
| 2012/0292913 | A1 * | 11/2012 | Turck | | 290/55 |

* cited by examiner

*Primary Examiner* — Julio C. Gonzalez R.
(74) *Attorney, Agent, or Firm* — James Ray and Assocs

(57) ABSTRACT

The invention provides an apparatus configured to convert kinetic energy of wind flow into electric energy. The apparatus includes a mast, a primary electric generator mounted on the mast, a secondary electric generator mounted on the mast in a tandem arrangement with the primary electric generator, blades affixed to a rotor shaft of the primary electric generator, a driving clutch affixed to the rotor shaft of the primary electric generator, a driven clutch affixed to a rotor shaft of the secondary electric generator, and endless elongated member connecting the driving clutch with the driven clutch. The apparatus is configured to convert a kinetic energy of a wind flow into an electric energy at one or both of the primary and secondary electric generators.

19 Claims, 6 Drawing Sheets

WIND POWERED ELECTRICAL GENERATOR HAVING A VARIABLE SPEED CLUTCH ARRANGEMENT

CROSS-REFERENCE TO RELATED APPLICATIONS

This application is related to and claims priority from U.S. Provisional Patent Application Ser. No. 61/779,364 filed on Mar. 13, 2013.

FIELD OF THE INVENTION

The present invention relates, in general, to wind turbines and, more particularly, this invention relates to wind energy harvesting apparatus having a pair of electric generators equipped with variable speed clutch arrangement.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND OF THE INVENTION

As is generally well known, conventional wind turbines include a blade assembly (propeller) mounted on a rotor shaft of a gearbox coupled to an electric generator and is further mounted to a vertical mast. The purpose for the gearbox is to accommodate operation of the wind turbine at low wind speeds.

However, conventional wind turbines are disadvantaged by the fact that once the propeller reaches a maximum rotational speed, the electric generator reaches its maximum output and the "remaining" wind speed and associated kinetic energy is wasted. Moreover, the "remaining" wind speed now generates additional stress and/or wear and tear onto the wind turbine.

Therefore, there is a need for an improved wind turbine that is operable at both low and high wind speeds and that eliminates use of a conventional gearbox.

SUMMARY OF THE INVENTION

The invention provides an apparatus configured to convert a kinetic energy of wind flow into an electric energy. The apparatus includes a mast, a primary electric generator mounted on the mast, a secondary electric generator mounted on the mast in a tandem arrangement with the primary electric generator, blades affixed to a rotor shaft of the primary electric generator, a driving clutch affixed to the rotor shaft of the primary electric generator, a driven clutch affixed to a rotor shaft of the secondary electric generator, and an endless elongated member connecting the driving clutch with the driven clutch. The apparatus is configured to convert the kinetic energy of the wind flow into the electric energy at one or both of the primary and secondary electric generators.

OBJECTS OF THE INVENTION

It is, therefore, one of the primary objects of the present invention to provide a wind energy harvesting apparatus having a pair of electric generators equipped with a variable speed clutch arrangement.

Another object of the present invention is to provide a wind energy harvesting apparatus having a pair of electric generators equipped with variable speed clutches being mechanically connected by a power transmission member.

Yet another object of the present invention is to provide a wind energy harvesting apparatus having a pair of electric generators equipped with a variable speed clutch arrangement, each having a variable speed clutch attached to an input shaft thereof.

A further object of the present invention is to provide a wind energy harvesting apparatus having a pair of electric generators equipped with a variable speed clutch arrangement, wherein only one electric generator has blades attached to an input shaft thereof.

Yet a further object of the present invention is to provide a wind energy harvesting apparatus having a pair of electric generators equipped with a variable speed clutch arrangement, wherein input shafts of electric generators are configured to rotate at different speeds.

Another object of the present invention is to provide a wind energy harvesting apparatus having a blade assembly mounted atop of a mast or tower and further having a pair of electric generators equipped with a variable speed clutch arrangement and mounted at the base of the mast or tower.

A further object of the present invention is to provide a wind energy harvesting apparatus having a blade assembly mounted atop of a mast or tower and further having a pair of electric generators equipped with a variable speed clutch arrangement and mounted at the base of the mast or tower within a hollow interior thereof.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
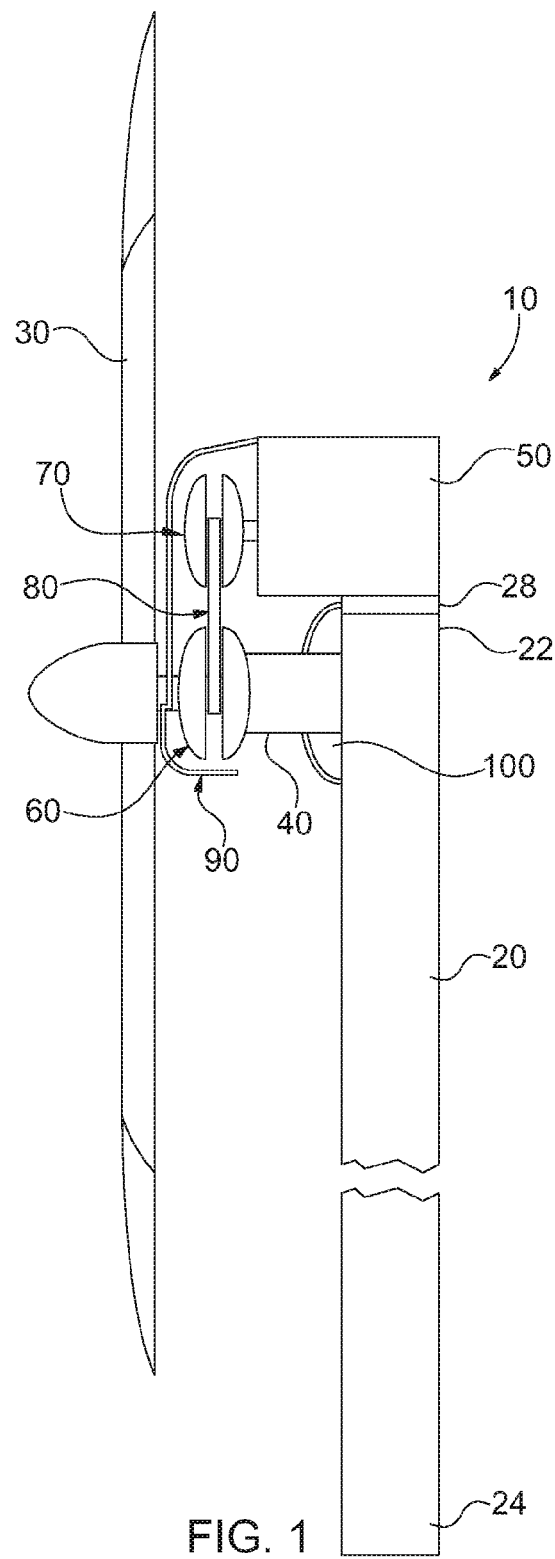
FIG. 1 is an elevation diagrammatic side view of a wind energy harvesting apparatus of the invention.

Prior to proceeding to the more detailed description of the present invention, it should be noted that, for the sake of clarity and understanding, identical components which have identical functions have been identified with identical reference numerals throughout the several views illustrated in the drawing figures.

Now in reference to FIGS. 1-4, the invention provides a wind energy harvesting apparatus 10 that includes a mast or tower 20, mounted generally vertically, as is conventional in the art. As is also conventionally, the mast 20 may include a rotating joint 28 at an upper end 22 thereof. There is a first or a primary electric generator 40 mounted either directly on the upper end 22 of the mast 20, on the exterior surface of the mast 20 or on the rotating joint 28. A second or secondary electric generator 50 is also mounted on the mast 20 in a tandem spaced apart arrangement with the primary electric generator 40. Blades or blade assembly 30 is affixed to a rotor shaft 42 of the primary electric generator 40. A clutch arrangement includes a first or driving clutch 60 affixed to the rotor shaft 42 of the primary electric generator 40 and a second or driven clutch 70 being affixed to a rotor shaft 52 of the secondary electric generator 50. An endless elongated member or drive member 80 is configured to connect the driving clutch 60 with the driven clutch 70. Preferably, such clutch arrangement is a variable speed clutch arrangement, whereby a working diameter of the second or driven clutch 70 increases with increase in a speed of the wind flow.

Also provided, is an optional cover 90 and a box or an enclosure 100 containing one or more spare drive members 80. The apparatus 10 is configured to convert a kinetic energy of a wind flow into an electric energy at one or both of the primary and secondary electric generators, 40 and 50 respectively.

As is shown in FIG. 1, the secondary electric generator 50 is mounted atop of the primary electric generator 40 being mounted to the exterior surface of the mast 20, although other mounting relationships are also contemplated.

It is presently preferred that the secondary electric generator 50 has a greater output of electric energy than the primary electric generator 40. It must be also noted that the secondary electric generator 50 is selected and/or sized that a combination of the primary and secondary generators, 40 and 50 respectively, is configured to generate a greater amount of electric energy than a pair of primary electric generator 40, each having the blades 30 affix thereto.

The endless elongated member 80 of the presently preferred embodiment is the belt of a type used in a power transmission art. In a further reference to FIGS. 2-4, each of the driving and driven clutches, 60 and 70 respectively, includes a pulley 64, 74 defined by a pair of halves, 64a and 74a respectively, mounted for a movement to and away from each other along an axis of a respective rotor shaft 62, 72. Working diameter of each pulley 64, 74 changes in a relationship to a magnitude of the kinetic energy of the wind flow. The invention also contemplates that the endless elongated member 80 may be provided as a chain, cable or in any other suitable form for power transmission.

Figure 4:
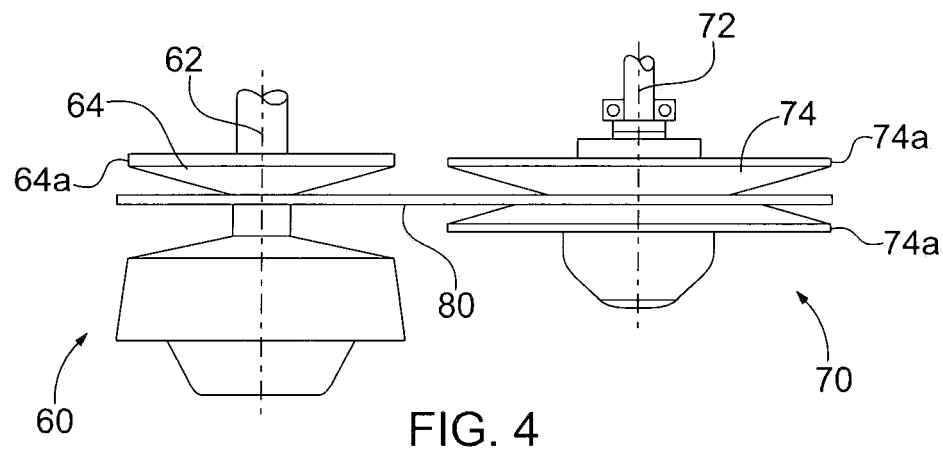
FIG. 4 is a schematic view of a pair of variable speed clutches employed within the apparatus of claim 1.

Furthermore, it is presently preferred for each of the driving and driven clutches, 60 and 70 respectively, to be a variable speed clutch of the TRA type, as best shown in FIG. 4.

In the instant invention, the pulley 74 on the driven clutch 70 rotates at greater speeds than the pulley 64 on the driving clutch 60 when a rotational speed of the blades 30 exceeds preselected output capacity, for example such as a maximum design output capacity, of the primary electric generator 60.

Figure 2:
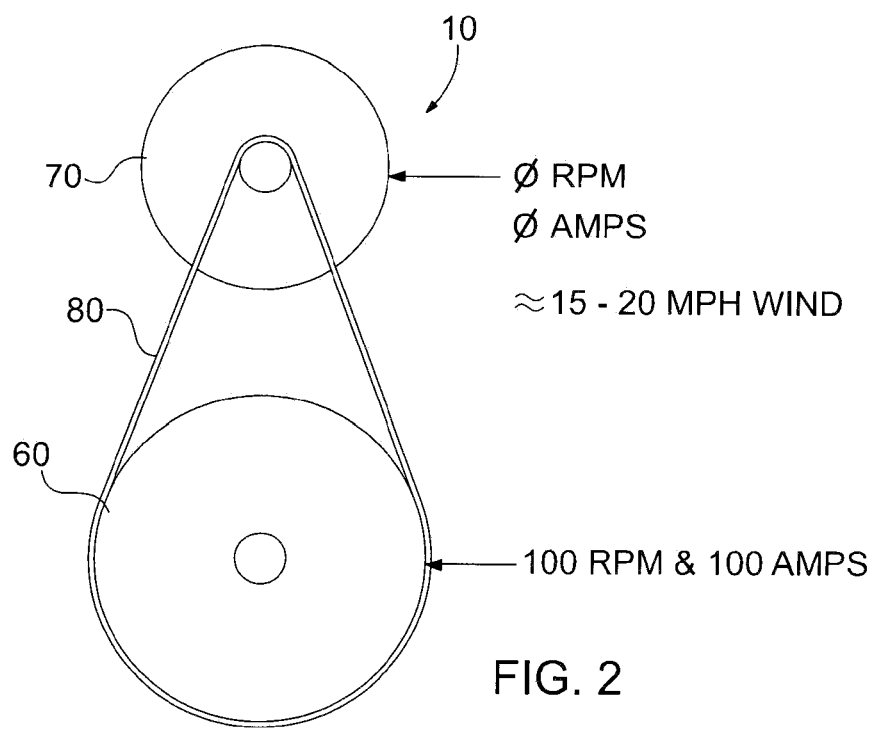
FIG. 2 is a diagrammatic view of the apparatus of FIG. 1, particularly illustrating ratios at low to medium wind speeds.

Now in a further reference to FIG. 2, when the apparatus 10 is exposed to low speed winds, for example in a range of between 0 and 20 miles per hour (MPH) and, more preferably, in the range of between 15 and 20 MPH, only the primary generator 40 is operable to convert the kinetic energy of the wind flow into the electric energy, as the rotational speed is not sufficient to increase diameter of the driven clutch 70.

Figure 3:
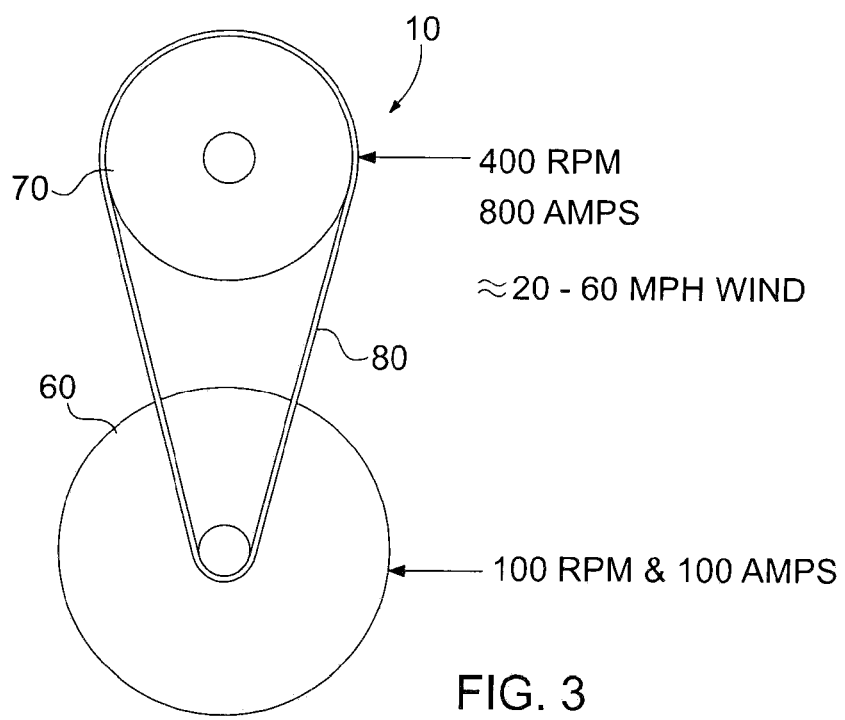
FIG. 3 is a diagrammatic view of the apparatus of FIG. 1, particularly illustrating ratios at medium to high wind speeds.

In reference to FIGS. 3-4, as the speed of the wind flow increases, for example in the range of between 20 and 60 MPH, an increased rotation of the blades 30 and, subsequently, an increased rotation of the rotor shaft 62 closes the halves 64a of the driving pulley 64 and increases the working diameter of the driven clutch 70 by opening (spreading apart) the halves 74a of the driven pulley 74 which now rotates at greater speeds than the driving pulley 64. Thus, the secondary electric generator 50 is configured to generate a greater amount of electric energy as compared to the electric energy generated at the primary electric generator 40, essentially by way of a mechanical transmission and gear ratios between the driving and driven clutches, 60 and 70 respectively.

It is within the scope of the instant invention to generate as many as 800 Amps of electric energy at high winds speeds at the secondary electric generator 50 as compared with 100-200 Amps at the primary electric generator 40.

Another advantage of the instant invention is that the apparatus 10 is configured to convert the kinetic energy of wind flow into the electric energy at the one or both of the primary and secondary electric generators, 40 and 50 respectively in absence of one or more conventional gearboxes.

Figure 5:
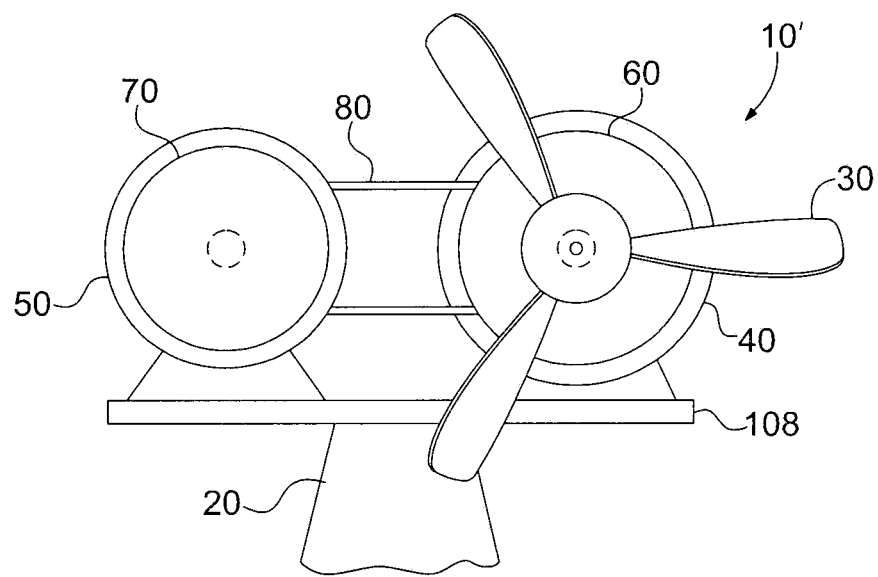
FIG. 5 is an elevation diagrammatic view of a wind energy harvesting apparatus constructed in accordance with another embodiment of the invention.

Although, the vertical arrangement of the primary and secondary electric generators, 40 and 50 respectively, of FIG. 1 is presently preferred, such primary and secondary electric generators, 40 and 50 respectively, may be mounted horizontally with each other, with or without the mast 20, as best shown in FIG. 5, for example where the apparatus, generally designated as 10', employs a platform 108. It is further contemplated that the mounting position of the primary and secondary electric generators, 40 and 50 respectively, may be reversed in the vertical direction.

It is further contemplated that the blade assembly 30, or suitable equivalent thereof, may be also mounted in a horizontal plane, for example on a roof of a building.

Figure 6:
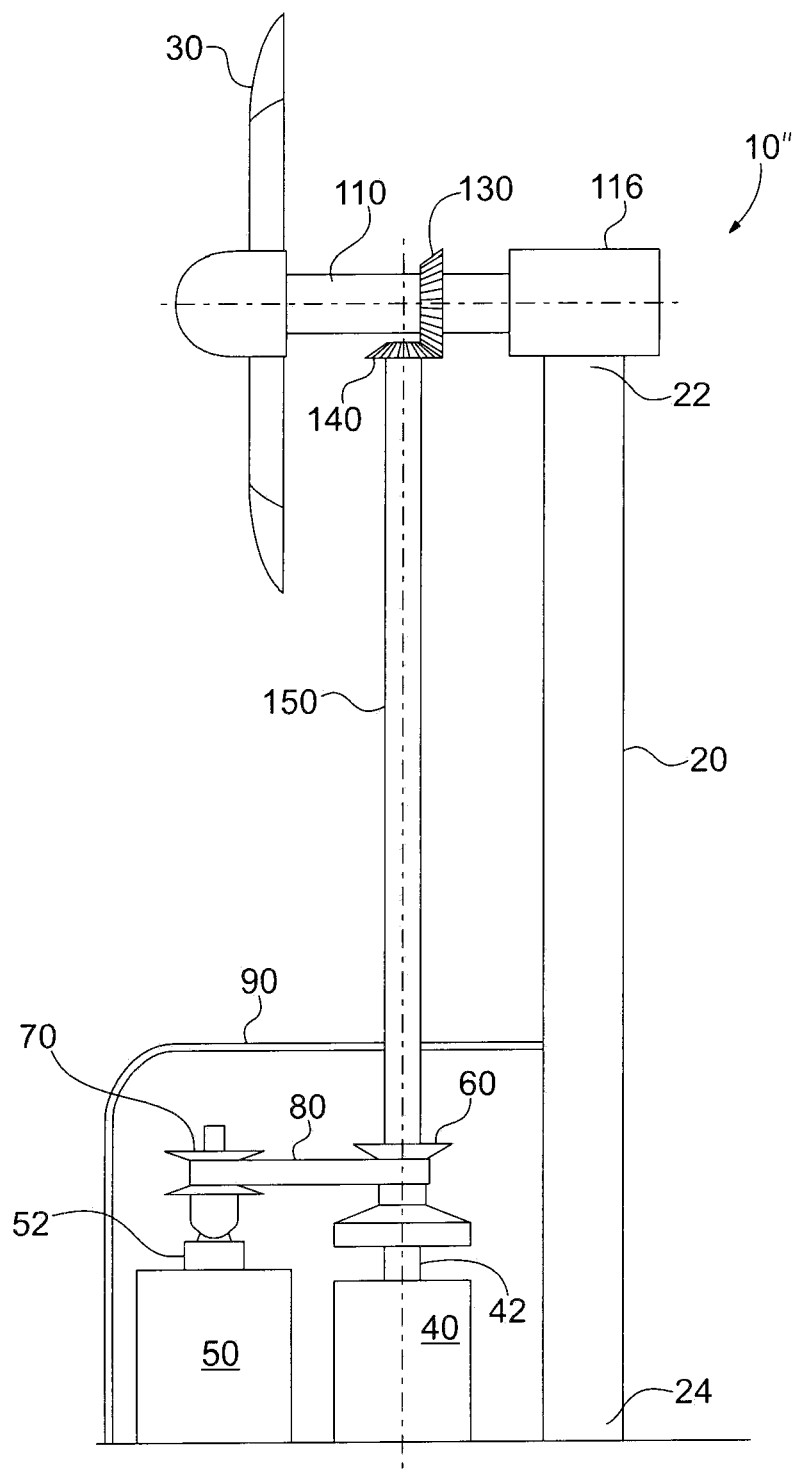
FIG. 6 is an elevation diagrammatic view of a wind energy harvesting apparatus constructed in accordance with yet another embodiment of the invention.

FIG. 6 illustrates an apparatus, generally designated as 10", constructed in accordance with another embodiment of the invention. The apparatus 10" includes the blade assembly 30 is mounted adjacent the top end 22 of the mast or tower 20, and rotates on a horizontally disposed shaft 110 supported, for example, by a bearing member 116. A first gear 130 is mounted mediate the ends of the shaft 110, for a rotation therewith in a vertical plane along a horizontally disposed rotational axis. A second gear 140 is mounted for a rotation in a horizontal plane, about a vertically disposed rotational axis, in an operative coupling with the first gear 130. A vertically disposed shaft 150 has one end thereof affixed to the second gear 140 and has the second end thereof coupled to the driving clutch 60. A cover 90 may be also provided to shield generators and clutches from environmental factors.

The advantage of this embodiment is that the electric generators 40 and 50 are mounted at the base or bottom end 24 of the mast 20, thus significantly reducing installation and/or maintenances costs. It is contemplated that any efficiency lost at the shafts 110, 150 and gears 130, 140 is easily offset by the greater electric energy generated through the electric generators 40 and 50 as described above.

Figure 7:
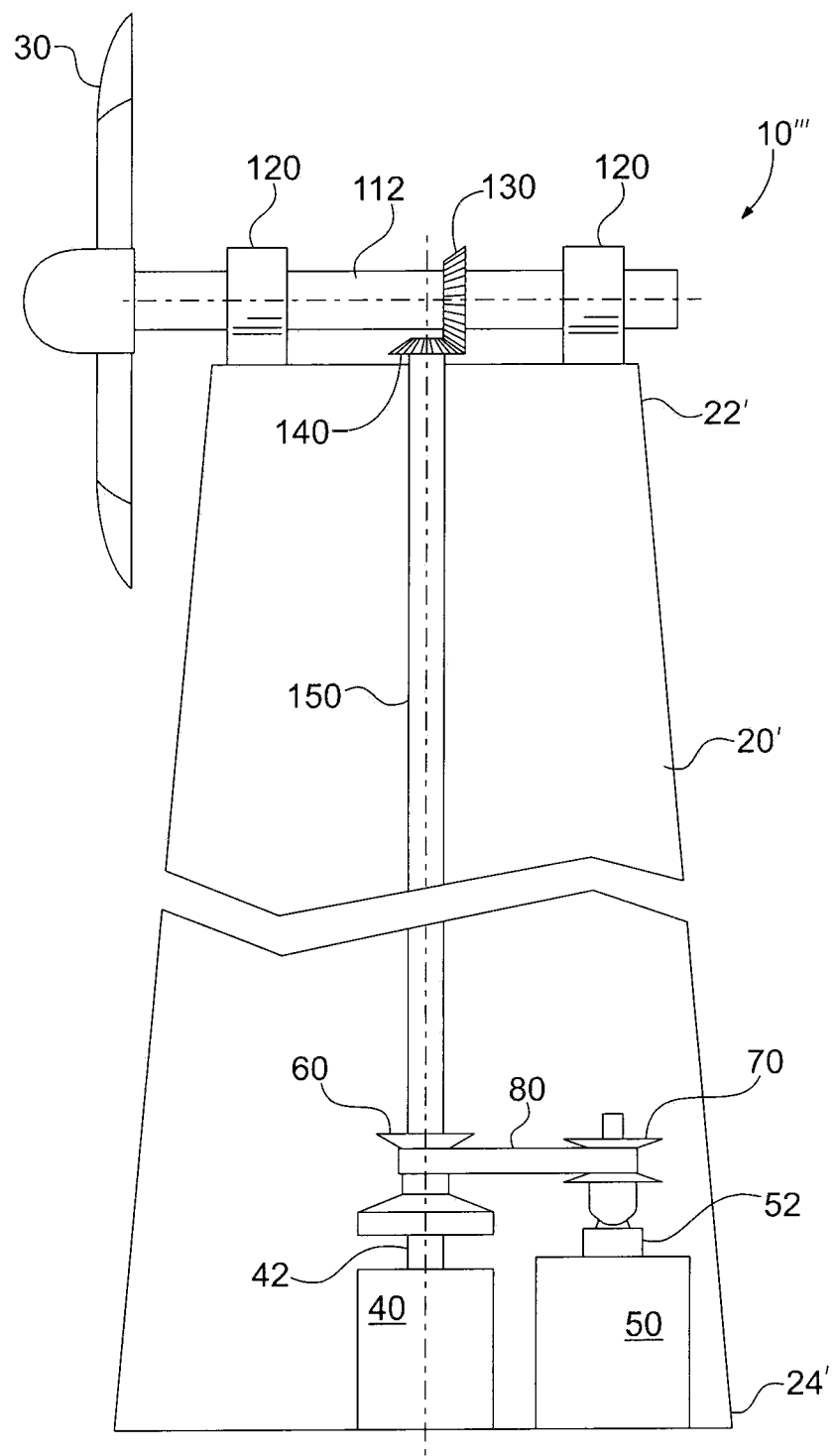
FIG. 7 is an elevation diagrammatic view of a wind energy harvesting apparatus constructed in accordance with a further embodiment of the invention.

FIG. 7 illustrates an apparatus, generally designated as 10''', constructed in accordance with yet another embodiment of the invention. Apparatus 10''' includes the blade assembly 30 being mounted atop of the mast or tower 20' and rotating on a horizontally disposed shaft 112 supported, for example, by a pair of pillow bearing blocks 120. A first gear 130 is mounted mediate the ends of the shaft 110, generally about the vertically disposed longitudinal axis of the mast 20. A second gear 140 is mounted for rotation in a horizontal plane in operative coupling with the first gear 130. Vertically disposed shaft 150 has one end thereof affixed to the second gear 140 and has the second end thereof coupled to the driving clutch 60. The advantage of this embodiment is that the electric generators 40 and 50 are mounted at the base of the mast 20 within a hollow interior thereof, thus significantly reducing installation and/or maintenances costs and is also being protected from environmental factors. Access to the electric generators 40 and 50 may be provided by way of a door or a removable panel (not shown). It is contemplated that any efficiency lost at the shafts 110, 150 and gears 130, 140 is easily offset by the greater electric energy generated through the electric generators 40 and 50 as described above.

For the sake of clarity covers or enclosures atop the mast 20 have been omitted herein for the sake of clarity and brevity.

Figure 8:
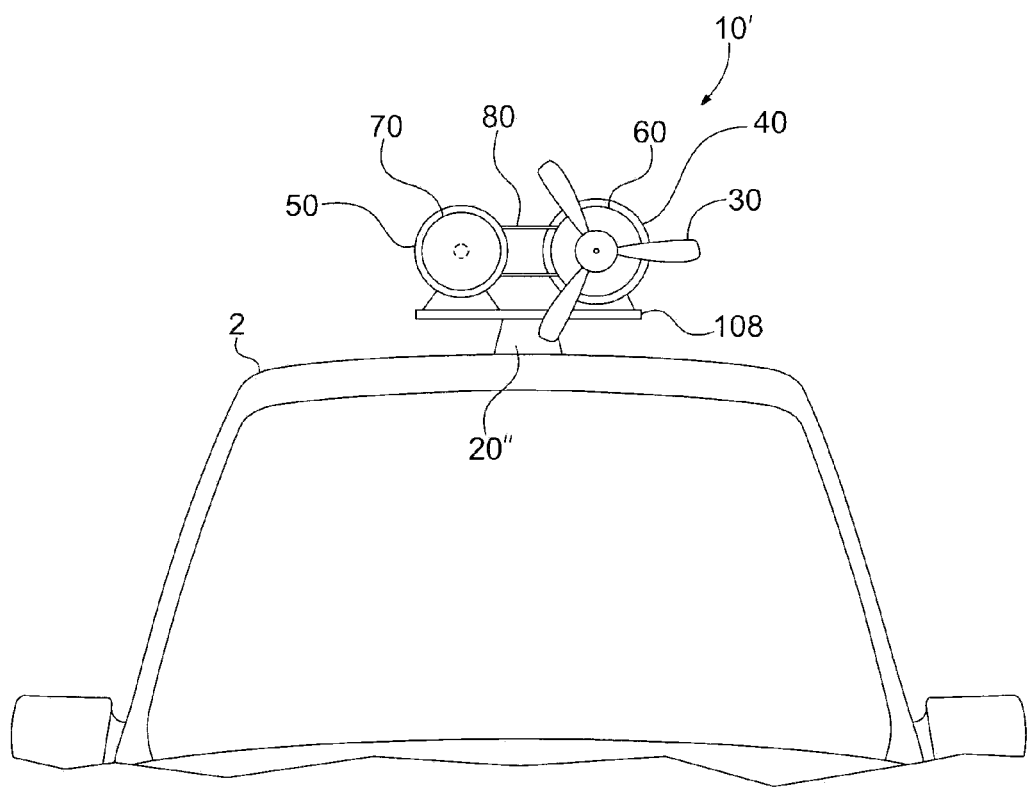
FIG. 8 is an elevation diagrammatic view of a wind energy harvesting apparatus constructed in accordance with yet a further embodiment of the invention, particularly illustrating the arrangement of FIG. 5 mounted atop of a conventional automobile.

In yet a further embodiment of FIG. 8, the apparatus of FIG. 5 is illustrated as being mounted on a mast 20" atop a conventional automobile 2. However, that instant invention contemplates that one or both electric generators 40, 50 may be mounted remotely from the blade assembly 30, for example in a proximity to the wheel axles or in a trunk compartment (not shown). Furthermore, the conventional automobile 2 may be replaced by any vehicle, either of a land or a marine type that requires electric energy.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. A wind energy harvesting apparatus comprising:
   (a) a mast;
   (b) a first electric generator;
   (c) a second electric generator mounted in a side-by-side spaced apart relationship with said first electric generator;
   (d) blades affixed to a rotor shaft of said first electric generator;
   (e) a clutch arrangement coupled to both of said first and second electric generators, said clutch arrangement comprising a first clutch affixed to said rotor shaft of said first electric generator, a second clutch affixed to a rotor shaft of said second electric generator, an endless elongated member connecting said first clutch with said second clutch, said clutch arrangement being a variable clutch arrangement, wherein said second clutch is a driven clutch having a working diameter thereof increasing with increase in a speed of the wind flow; and
   (f) said wind energy harvesting apparatus configured to convert a kinetic energy of a wind flow into an electric energy at one or both of said first and second electric generators.

2. The apparatus of claim 1, wherein said first and second electric generators are mounted external to said mast in a close proximity to a top end thereof.

3. The apparatus of claim 2, wherein said second electric generator is mounted on said top end of said mast and wherein said first electric generator is attached to an exterior surface of said mast below said second electric generator.

4. The apparatus of claim 1, wherein said first and second electric generators are mounted within a hollow interior of said mast in a close proximity to a bottom end thereof and wherein said apparatus further includes an arrangement configured to couple a rotation of said blades with said first clutch.

5. The apparatus of claim 4, wherein said arrangement includes:
   (a) two bearing blocks mounted external to a top end of said mast in a spaced apart relationship with each other;
   (b) a first shaft supported for a rotation in a horizontal plane by said two bearing blocks, wherein said blades are mounted to one end of said first shaft;
   (c) a first gear mounted on said first shaft for a rotation in a vertical plane about a horizontally disposed rotational axis;
   (d) a second gear disposed for a rotation in said horizontal plane and in an operative alignment with said first gear; and
   (e) a second shaft having one end thereof connected to said second gear and having an axially opposite end thereof connected to said first clutch.

6. The apparatus of claim 5, wherein each of said first and second gears is a beveled gear.

7. The apparatus of claim 1, wherein said endless elongated member is a belt and wherein each of said first and second clutches includes a pulley defined by a pair of halves mounted for movement to and away from each other along an axis of a respective rotor shaft.

8. The apparatus of claim 7, wherein a working diameter of each pulley changes in a relationship to a magnitude of the kinetic energy of the wind flow.

9. The apparatus of claim 7, wherein a pulley on said second clutch rotates at greater speeds than a pulley on said first clutch when a rotational speed of said blades is at or near a maximum preselected design setting.

10. The apparatus of claim 1, wherein said apparatus is configured to convert the kinetic energy of the wind flow into the electric energy at said one or both of said first and second electric generators in absence of gearboxes.

11. The apparatus of claim 1, wherein said second electric generator generates a greater output of the electric energy than said first electric generator.

12. The apparatus of claim 1, wherein a combination of said first and second electric generators is configured to generate a greater amount of electric energy than a pair of first electric generators, each having blades affixed thereto.

13. The apparatus of claim 1, wherein said clutch arrangement is a variable clutch arrangement, whereby a working diameter of said second clutch increases with increase in a speed of the wind flow.

14. The apparatus of claim 1, wherein said apparatus is configured to convert the kinetic energy of wind flow into the electric energy in an absence of one or more gearboxes.

15. The apparatus of claim 1, wherein said clutch arrangement is configured so that only said first electric generator is operable to convert the kinetic energy of the wind flow into the electric energy at low wind speeds in a range of between 0 and 20 miles per hour (MPH), that are not sufficient to increase a diameter of said second clutch.

16. A wind energy harvesting apparatus comprising:
   (a) a mast having a top end and an axially opposite bottom end;
   (b) a first electric generator mounted adjacent said bottom end of said mast;
   (c) a first clutch affixed to a rotor shaft of said first electric generator;
   (d) a second electric generator mounted adjacent said bottom end of said mast in a tandem spaced apart relationship with said first electric generator;

(e) a second clutch affixed to a rotor shaft of said second electric generator;
(f) an endless elongated member connecting said first clutch with said second clutch, said second clutch and said first clutch being a variable clutch arrangement, wherein said second clutch is a driven clutch having a working diameter thereof increasing with increase in a speed of the wind flow;
(g) a first shaft mounted for a rotation in a horizontal plane adjacent said top end of said mast;
(h) blades affixed to one end of said first shaft;
(i) a first gear mounted on said first shaft for a rotation in a vertical plane;
(j) a second gear disposed for a rotation in said horizontal plane and in an operative alignment with said first gear;
(k) a second shaft having one end thereof connected to said second gear and having an axially opposite end thereof connected to said first clutch; and
(l) whereby said wind energy harvesting apparatus is configured to convert a kinetic energy of a wind flow into an electric energy at one or both of said first and second electric generators.

17. The apparatus of claim 16, wherein said mast includes a hollow interior and wherein said first and second clutches, said first and second electric generators and said endless elongated member are mounted within a hollow interior of said mast.

18. A wind energy harvesting apparatus comprising:
(a) a first electric generator;
(b) a second electric generator mounted in a side-by-side spaced apart relationship with said first electric generator;
(c) blades affixed to a rotor shaft of said first electric generator;
(d) a variable clutch arrangement comprising a driving first clutch affixed to said rotor shaft of said first electric generator, a driven second clutch affixed to a rotor shaft of said second electric generator, an endless elongated member connecting said first clutch with said second clutch, each of said first and second clutches includes a pulley defined by a pair of halves mounted for movement to and away from each other along an axis of a respective rotor shaft, a pulley on said second clutch rotates at greater speeds than a pulley on said first clutch when a rotational speed of said blades is at or near a maximum preselected design setting; and
(e) said wind energy harvesting apparatus is configured to convert a kinetic energy of a wind flow into an electric energy at one or both of said first and second electric generators.

19. The wind energy harvesting apparatus of claim 18 comprising a mast.

* * * * *